(12) United States Patent  (10) Patent No.: US 8,589,786 B2
Johnston  (45) Date of Patent: Nov. 19, 2013

(54) TRADEMARK REPORT WITH STORE LAYOUT DIAGRAM

(75) Inventor: Scott W. Johnston, Minneapolis, MN (US)

(73) Assignee: Merchant & Gould P.C., Minneapolis, MN (US)

( * ) Notice: Subject to any disclaimer, the term of this patent is extended or adjusted under 35 U.S.C. 154(b) by 234 days.

(21) Appl. No.: 12/749,618

(22) Filed: Mar. 30, 2010

(65) Prior Publication Data

US 2011/0246452 A1 Oct. 6, 2011

(51) Int. Cl.
*G06F 17/27* (2006.01)

(52) U.S. Cl.
USPC .......................................... 715/233; 715/211

(58) Field of Classification Search
USPC .................................................. 715/211, 233
See application file for complete search history.

(56) References Cited

U.S. PATENT DOCUMENTS

| | | | |
|---|---|---|---|
| 6,000,610 A * | 12/1999 | Talbott et al. | 235/383 |
| 6,993,533 B1 * | 1/2006 | Barnes | 1/1 |
| 7,896,245 B2 * | 3/2011 | Toyokawa et al. | 235/385 |
| 2002/0099560 A1 * | 7/2002 | Enfield | 705/1 |
| 2003/0158743 A1 * | 8/2003 | Havlick et al. | 705/1 |
| 2005/0123654 A1 * | 6/2005 | Christensen et al. | 426/104 |
| 2005/0289473 A1 * | 12/2005 | Gustafson et al. | 715/764 |
| 2008/0183383 A1 * | 7/2008 | Asai et al. | 701/212 |

* cited by examiner

*Primary Examiner* — Doug Hutton, Jr.
*Assistant Examiner* — Andrew Dyer
(74) *Attorney, Agent, or Firm* — Merchant & Gould P.C.

(57) ABSTRACT

The results of a trademark availability search can be graphically depicted using a store layout diagram. A store layout diagram shows the layout of a store including the various sections of the store. Graphical elements representing trademarks are arranged on the store layout diagram and positioned so that they are visually associated with the relevant sections of the store.

18 Claims, 8 Drawing Sheets

TRADEMARK REPORT WITH STORE LAYOUT DIAGRAM

BACKGROUND

When a business is in the process of selecting a trademark to be used in association with a new product or service, a trademark availability search may be performed. The trademark availability search is typically performed across one or more trademark databases where information about trademark usage is stored, or across common law sources, such as the World Wide Web. A record of each trademark identified in the search is obtained and the records are often compiled into a search report.

When a large number of potentially relevant trademarks are identified in the search, it can be difficult to get a clear understanding of the trademark landscape. This difficulty is compounded when the trademark being considered is planned to be used in association with multiple different goods or services.

SUMMARY

In general terms, this disclosure is directed to generation of a trademark report. In one possible configuration and by non-limiting example, the trademark report includes a store layout diagram that includes graphical representations of trademarks.

One aspect is a method of graphically depicting trademark information, the method comprising annotating a store layout diagram with icons with a computing device, the store layout diagram including graphical elements representing different sections of a store, and each icon representing a trademark of a trademark search report, wherein each icon is positioned on the annotated store layout diagram to visually associate the icon with at least one section of the store.

Another aspect is a method of graphically depicting trademark information, the method comprising: identifying a set of trademarks found during a trademark search and relating to a first trademark; and for each trademark of the set of trademarks, graphically depicting the trademark on a store layout diagram with a graphical element by a computing device, wherein the store layout diagram includes a graphical representation of a store including sections of the store, and wherein each icon is positioned to at least partially visually overlap at least one of the sections in the store layout diagram.

Yet another aspect is a system for generating a trademark report, the system including a display device; a processing device; and memory, the memory storing instructions which, when executed by the processing device, cause the processing device to generate a display on the display device, the display including a store layout diagram; and annotate the store layout diagram with graphical elements, each graphical element representing a trademark identified in a trademark search report.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
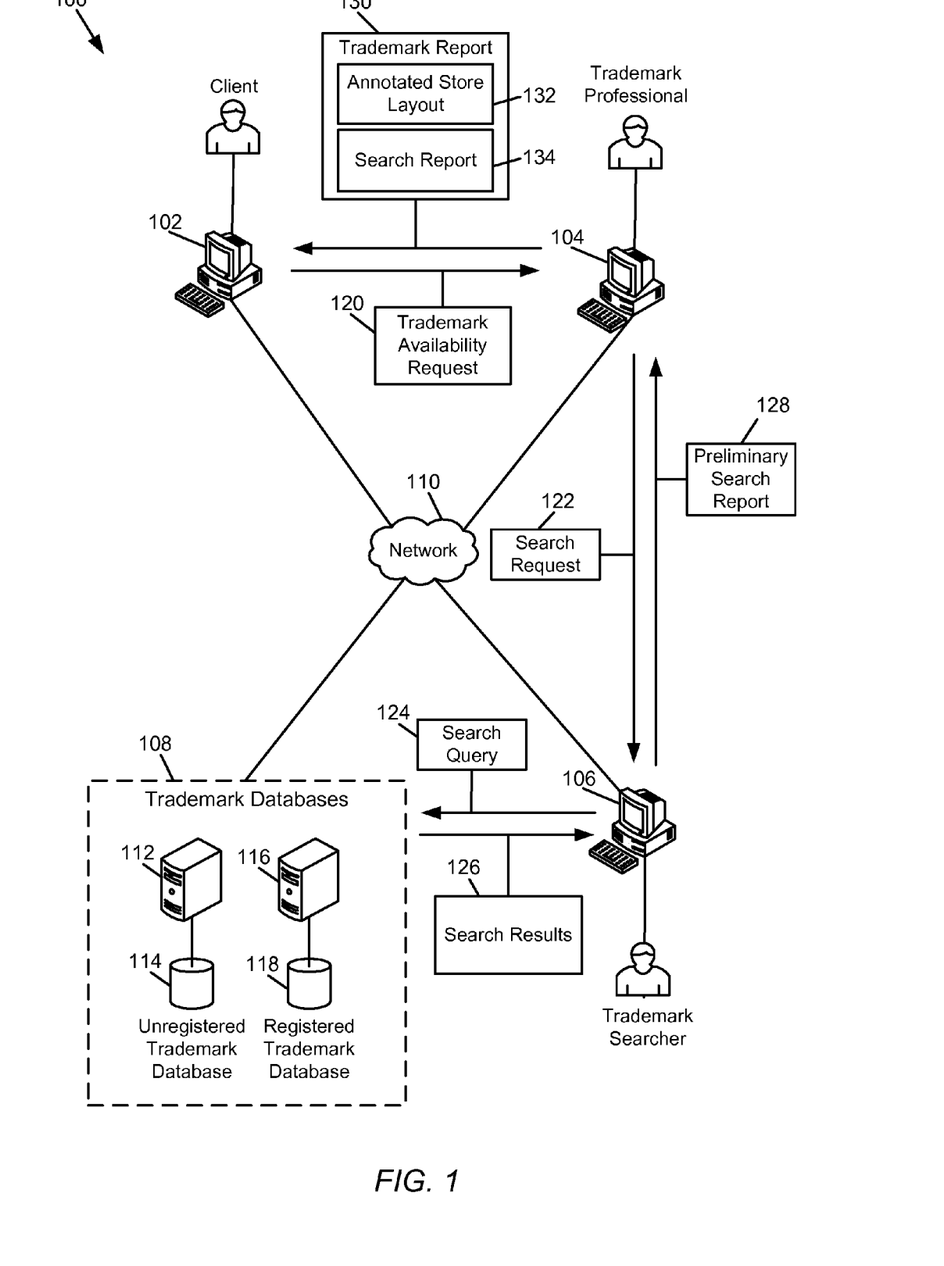
FIG. 1 is a schematic diagram illustrating an example system for generating a trademark report.

FIG. 1 is a schematic diagram illustrating an example system 100 for generating a trademark report 130. In some embodiments, various users interact with system 100, such as a client, a trademark professional, and a trademark searcher. In this example, system 100 includes computing devices 102, 104, and 106 and trademark databases 108, which are in data communication with communication network 110.

In some embodiments, communication between computing devices 102, 104, 106, and trademark databases 108 occurs across communication network 110. An example of a communication network is the Internet. In some embodiments, communication network 110 is a combination of two or more networks, including a wide area network (such as the Internet), a local area network, a cellular telephone network, a telephone system network, or other communication networks.

Computing device 102 is provided to interact with the client. Examples of computing device 102 are described in more detail below with reference to FIGS. 2-3.

In some embodiments, computing device 102 generates and sends a trademark availability request to computing device 104. The trademark availability request 120 typically identifies a trademark that the client would like to use in association with goods and/or services.

In another possible embodiment, trademark availability request 120 is communicated from the client to the trademark professional through a telephone call (using telephones), facsimile (using fax machines), video conference (using video conferencing devices), or a face-to-face conversation.

Computing device 104 is provided to interact with the trademark professional. Examples of computing device 104 are described in more detail below with reference to FIGS. 2 and 4.

In some embodiments, computing device 104 receives the trademark availability request 120 from computing device 102 and displays it to the trademark professional. In response, the trademark professional interacts with computing device 104 to generate and send search request 122. Search request 122 typically identifies the trademark that was identified in the trademark availability request 120, and requests that a search be conducted of trademark databases 108 for relevant trademarks. In other possible embodiments, other devices are used to send and receive trademark availability request 120, such as a telephone, a fax machine, a video conferencing device. In yet another possible embodiment, the trademark availability request 120 is made through a face-to-face communication.

Computing device 106 is provided to interact with the trademark searcher. Examples of computing device 106 are described in more detail below with reference to FIGS. 2 and 8.

In some embodiments, computing device 106 receives search request 122 and displays it to the trademark searcher. In response, the trademark searcher interacts with computing device 106 to generate and send search query 124 to trademark databases 108.

Trademark databases 108 maintain data relating to trademark usage. In some embodiments, trademark databases 108 include servers 112 and 116 that are configured to execute search queries across the respective trademark databases. A search query 124 can include one or more of: a search term, a description of a good or service, a classification number of a good or service, a trademark status (i.e., active, dead, or all), or other search scope limitations.

Examples of trademark databases include unregistered trademark databases 114 and registered trademark databases 118. An example of an unregistered trademark database 114 is the World Wide Web, in which web pages contain data relating to existing usages of various trademarks around the world. Unregistered trademarks are sometimes referred to in the United States as common law trademarks because they can give the owner rights under state common law. Registered trademarks are those that have been officially recognized by a government, such as through a national, regional, or international trademark registration system.

Server 112 is provided to index the data from database 114, and execute search queries. An example of server 112 is a search engine server, such as those operated by Google Inc., Yahoo! Inc., and Microsoft Corporation.

Examples of servers 116 are those operated by the government, such as the United States Patent and Trademark Office, or the respective trademark offices of other countries around the world. Another example of server 116 is a server operated by a commercial trademark search vendor, such as Corporation Service Company, Thompson Compumark, and CT Corsearch. Any number of servers and trademark databases can be utilized in various embodiments.

When the search query 124 is received by servers 112 and/or 116 of trademark databases 108, servers 112 and/or 116 return search results 126. Search results 126 typically identify trademark data that includes exact matches to the one or more search terms (or includes a word or phrase that is similar to one or more search terms) and is within the identified search scope. The search results 126 can include a list of potentially relevant references, such as a list of 10 or 20 of the highest ranked search results from a search engine, along with links to the relevant records. Alternatively, the search results 126 can include copies of the relevant records directly.

Search results 126 are returned to computing device 106 where they are reviewed by the trademark searcher and at least some of the relevant records are compiled into a preliminary search report 128, which is then sent to computing device 104. Preliminary search report 128 can be communicated by computing device 106 to computing device 104 in a variety of different manners, such as an attachment to an e-mail message, or by posting on a password protected web site that the trademark professional accesses with computing device 104 to download or view the preliminary search report 128. In another possible embodiment, the preliminary search report 128 is sent from the trademark searcher to the trademark professional using other communication devices, such as fax machines connected to a network, or a printed copy is sent through a mail or other delivery service.

Computing device 104 receives preliminary search report 128 and displays it to the trademark professional. Alternatively, or in addition, search report 128 can be printed out for subsequent review by the trademark professional. The trademark professional reviews the search report 128 and interacts with computing device 104 to generate search report 134, which may include, for example, a subset of records from preliminary search report 128 that the trademark professional thought were most relevant or would be of greatest interest to the client. An example of a search report is illustrated and described in more detail herein with reference to FIG. 6.

Computing device 104 also generates or obtains a store layout diagram graphically illustrating the layout of a store associated with the client's business. An example of a store layout diagram is shown and described in more detail with reference to FIG. 5.

Computing device 104 generates a trademark report 130 that is sent to computing device 102. In some embodiments, trademark report 130 includes annotated store layout diagram 132 and search report 134. Trademark report 130 is illustrated and described in more detail herein with reference to FIG. 7.

Computing device 102 receives trademark report 130 and displays it to the client. The client then reviews trademark report 130 and uses it to assist the client in making a business decision, such as whether or not to adopt the trademark in association with goods or services provided by the client's company.

Although FIG. 1 illustrates an example system 100, it is recognized that other embodiments have other structures. For example, in some embodiments more or fewer people are involved. For example, in some embodiments the trademark professional and the trademark searcher are the same person. In some embodiments some operations are performed by an assistant, colleague, or business partner of the person noted. For example, a trademark professional's administrative assistant can perform some of the operations of the trademark professional, and a colleague can perform some of the operations of the client even though the example embodiments describe such operations as being performed by the trademark professional and the client respectively. In some embodiments, operations that could be performed by a person are instead performed automatically or partially automated by one or more computing devices. Operations described as being performed by a single computing device can alternatively be performed separately by two or more computing devices.

Figure 2:
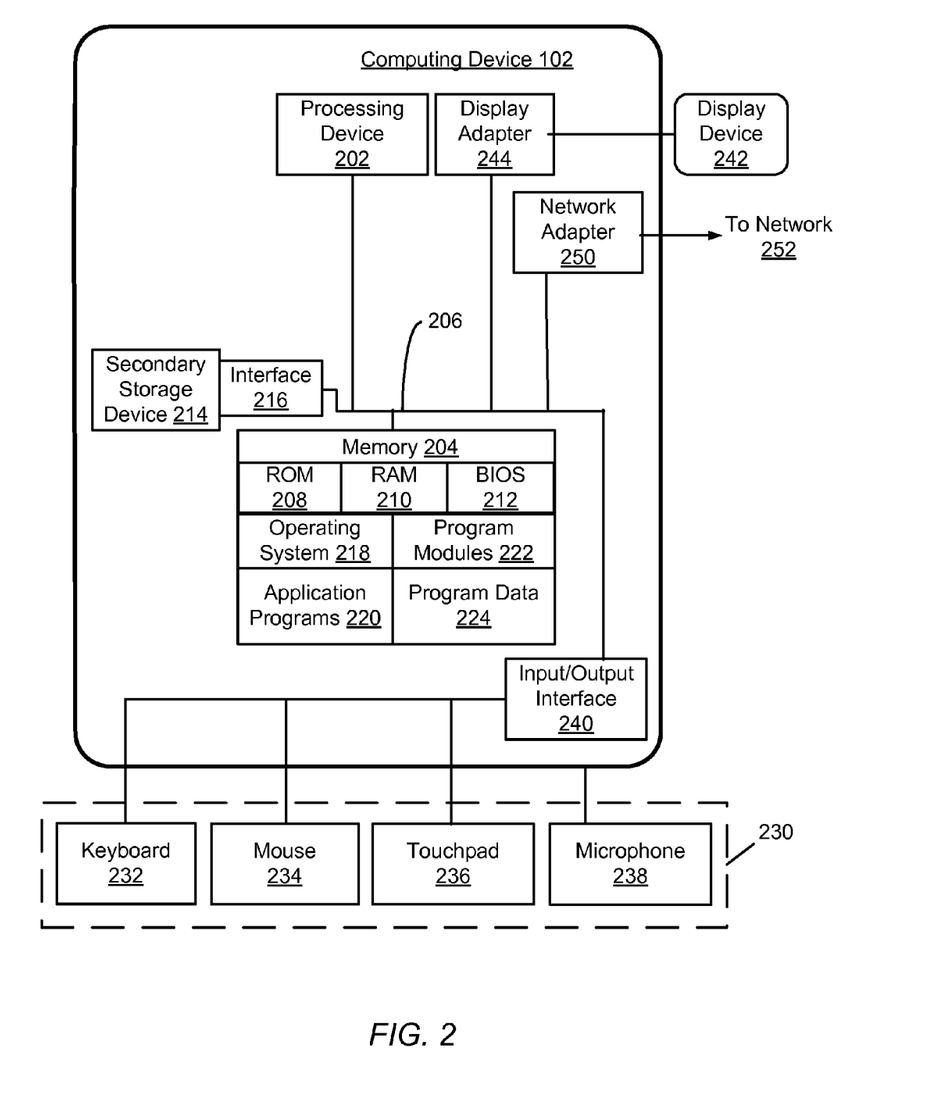
FIG. 2 is a schematic block diagram illustrating an architecture of an example computing device of the system shown in FIG. 1.

FIG. 2 is a schematic block diagram illustrating an architecture of an example computing device 102. Although described herein as an example of the client's computing device 102, the computing device shown in FIG. 2 is also an example of a suitable architecture for computing device 104, computing device 106, and/or servers 112 and 116. In one example, computing device 102 is a personal computer. Other embodiments include other computing devices 102, such as a tablet computer, a smart phone, a personal digital assistant (PDA), or other device configured to process data instructions.

Computing device 102 includes, in some embodiments, at least one processing device 202 and memory 204. A variety of processing devices 202 are available from a variety of manufacturers, for example, Intel or Advanced Micro Devices. In some embodiments, the processing device 202 is configured to one or more methods or operations as defined by instructions stored in memory.

Computing device 104 also includes, in some embodiments, at least one memory device 204. Examples of memory 204 include read-only memory 208 and random access memory 210. Basic input/output system 212, containing the basic routines that act to transfer information within computing device 102, such as during start up, is typically stored in read-only memory 208. Memory device 204 can be a part of processing device 202 or can be separate from processing device 202.

In this example, computing device 102 also includes system bus 206 that couples various system components including memory 204 to processing device 202. System bus 206 is one of any number of types of bus structures including a memory bus, or memory controller; a peripheral bus; and a local bus using any of a variety of bus architectures.

In some embodiments, computing device 102 also includes secondary storage device 214 for storing digital data. An example of a secondary storage device is a hard disk drive. Secondary storage device 214 is connected to system bus 206 by secondary storage interface 216. Secondary storage devices 214 and their associated computer readable media provide nonvolatile storage of computer readable instructions (including application programs and program modules), data structures, and other data for computing device 102.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, read only memories, or other memory devices.

A number of program modules can be stored in secondary storage device 214 or memory 204, including operating system 218, one or more application programs 220, other program modules 222, and program data 224. In some embodiments, program modules include data instructions that are stored in computer readable media (such as computer readable storage media). The data instructions, when executed by the processing device 202, cause the processing device 202 to perform one or more of the methods or operations described herein.

In some embodiments, a user provides inputs to the computing device 102 through one or more input devices 230. Examples of input devices 230 include keyboard 232, mouse 234, touchpad 236 (or a touch sensitive display), and microphone 238. Other embodiments include other input devices 230. Input devices 230 are often connected to the processing device 202 through input/output interface 240 that is coupled to system bus 206. These input devices 230 can be connected by any number of input/output interfaces, such as a parallel port, serial port, game port, or a universal serial bus. Wireless communication between input devices and interface 240 is possible as well, and includes infrared, BLUETOOTH® wireless technology, 802.11a/b/g/n wireless communication, cellular communication, or other radio frequency communication systems in some possible embodiments.

In some embodiments, a display device 242, such as a monitor, liquid crystal display device, projector, or touch screen display device, is also connected to system bus 206 via an interface, such as display adapter 244. In addition to display device 242, the computing device 102 can include various other peripheral devices (not shown), such as speakers or a printer.

When used in a local area networking environment or a wide area networking environment (such as the Internet), computing device 102 is typically connected to network 252 through a network interface or adapter 250. Other possible embodiments use other communication devices. For example, some embodiments of computing device 102 include a modem for communicating across network 252.

Computing device 102 typically includes at least some form of computer-readable media. Computer readable media include any available media that can be accessed by computing device 102. By way of example, computer-readable media include computer readable storage media and communication media.

Computer readable storage media includes volatile and nonvolatile, removable and non-removable media implemented in any device configured to store information, such as computer readable instructions, data structures, operating systems 218, application programs 220, program modules 222, program data 224, or other data. Memory 204 is an example of computer readable storage media. Computer readable storage media includes, but is not limited to, read-only memory 208, random access memory 210, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by computing device 102. In some embodiments, computer readable storage media includes computer non-transitory media.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. In some embodiments, communication media is transitory media. Combinations of any of the above are also included within the scope of computer readable media.

Figure 3:
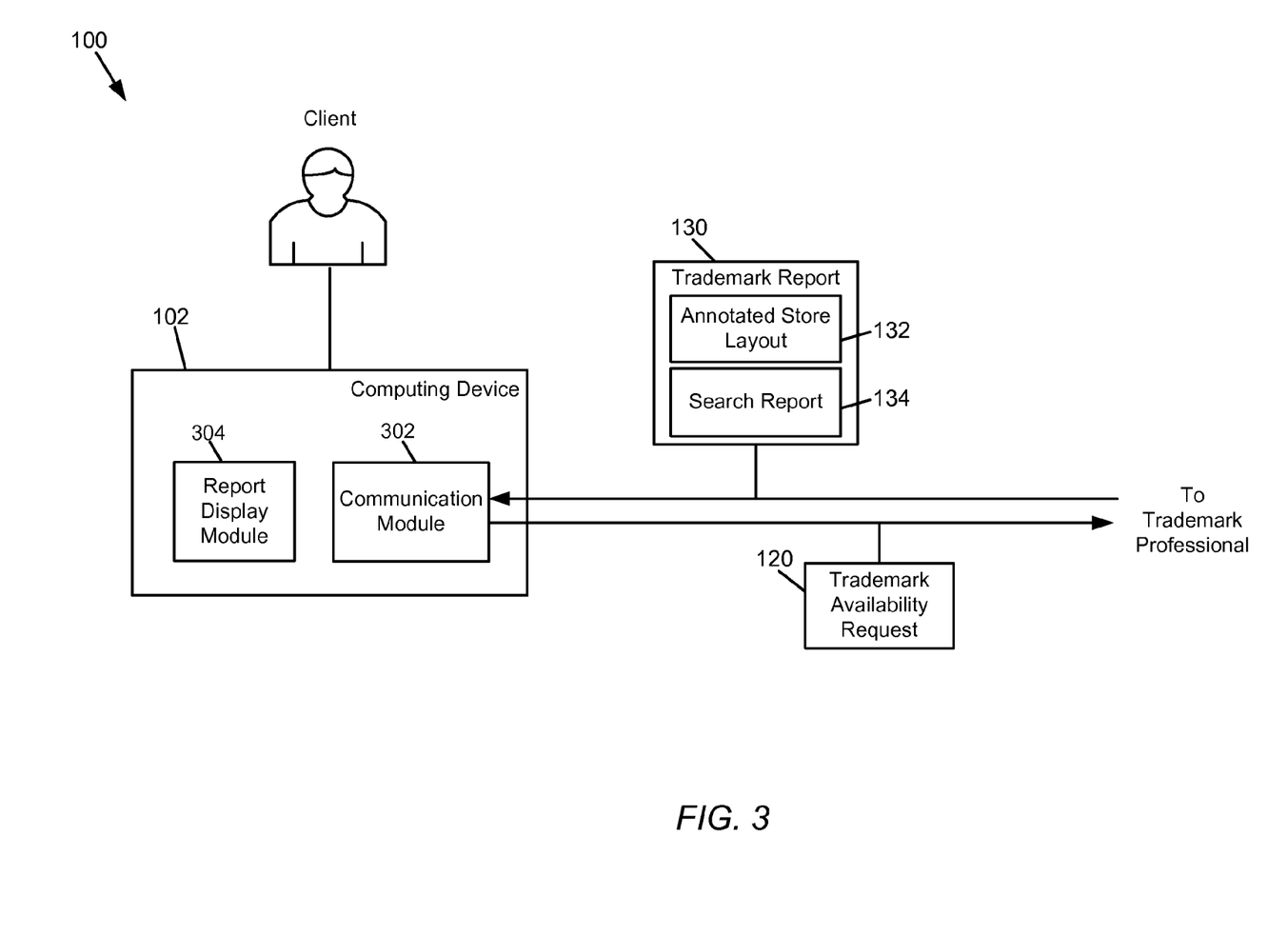
FIG. 3 illustrates a portion of system 100 including a client's computing device.

FIG. 3 illustrates a portion of system 100 including the client's computing device 102. In some embodiments, computing device 102 generates a trademark availability request 120 and receives a trademark report 130, including an annotated store layout diagram 132 and search report 134. In this example, computing device 102 includes a communication module 302 and a report display module 304.

In some embodiments, communication module 302 operates to communicate data across a data communication network, such as to communicate with the trademark professional across network 110 (shown in FIG. 1).

An example of communication module 302 is an e-mail software application. In this example, the client utilizes the e-mail software application operating on computing device 102 to generate an e-mail to the trademark professional. The e-mail includes an identification of a trademark that the client is considering adopting, and may also include a written request for the trademark professional to evaluate the availability of the mark.

The e-mail may also contain an indication that the client desires to use this trademark in association with multiple or many different goods or services, or an indication that the client desires to use the trademark as a house mark. In some embodiments, the client also attaches a floor layout diagram that the trademark professional can annotate as part of the trademark report 130.

The e-mail software application also operates, in some embodiments, to receive trademark report 130 from the trademark professional after it has been generated.

In another possible embodiment, communication module 302 is a browser software application that displays web page data received from a remote web server. For example, in some embodiments the client utilizes a web-based e-mail application, which is accessed by the client through the browser software application operating on computing device 102. Examples of web-based e-mail applications include the GMAIL webmail service provided by Google, Inc., the HOTMAIL webmail service provided by Microsoft, Inc., and the Y! MAIL webmail service provided by Yahoo! Inc. As in the above example, the web-based e-mail application can be used to send trademark availability request 120 and to receive trademark report 130.

In another possible embodiment, communication module 302 is a browser software application that the client uses to access a trademark search interface. The trademark search interface is provided by a remote web server that is configured to receive a trademark availability request 120 from the client. The interface prompts the client to identify the desired trademark, and may also prompt the client for additional information, such as to describe the goods or services that the client would like to distribute in connection with the trademark. In this example, the trademark search interface then sends the trademark availability request 120 to the trademark professional.

In another possible embodiment, communication module 302 is a custom software application operating on client computing device 102 that performs one or more of the operations described herein, such as generating a trademark availability request 120 and receiving a trademark report.

When trademark report 130 has been received by computing device 102, report display module 304 is used, in some embodiments, to display it. An example of report display module 304 is the ADOBE ACROBAT software application. For example, in some embodiments trademark report 130 is stored in a portable document format (PDF). The ACROBAT software application operates to read the PDF formatted trademark report 130, and to display the trademark report 130 to the client. Alternatively, the trademark report 130 can be output, such as by printing the trademark report 130 onto paper.

Other examples of report display module 304 include the MICROSOFT OFFICE WORD software application, the MICROSOFT OFFICE VISIO software application, the ADOBE ACROBAT reader software application, a browser software application such as MICROSOFT INTERNET EXPLORER web browser, and combinations of these. Other graphic, text, or multimedia editors or reader software application are used in other embodiments, including web-based application operating on a remote server. In some embodiments report display module 304 is a custom software application or web service.

Figure 4:
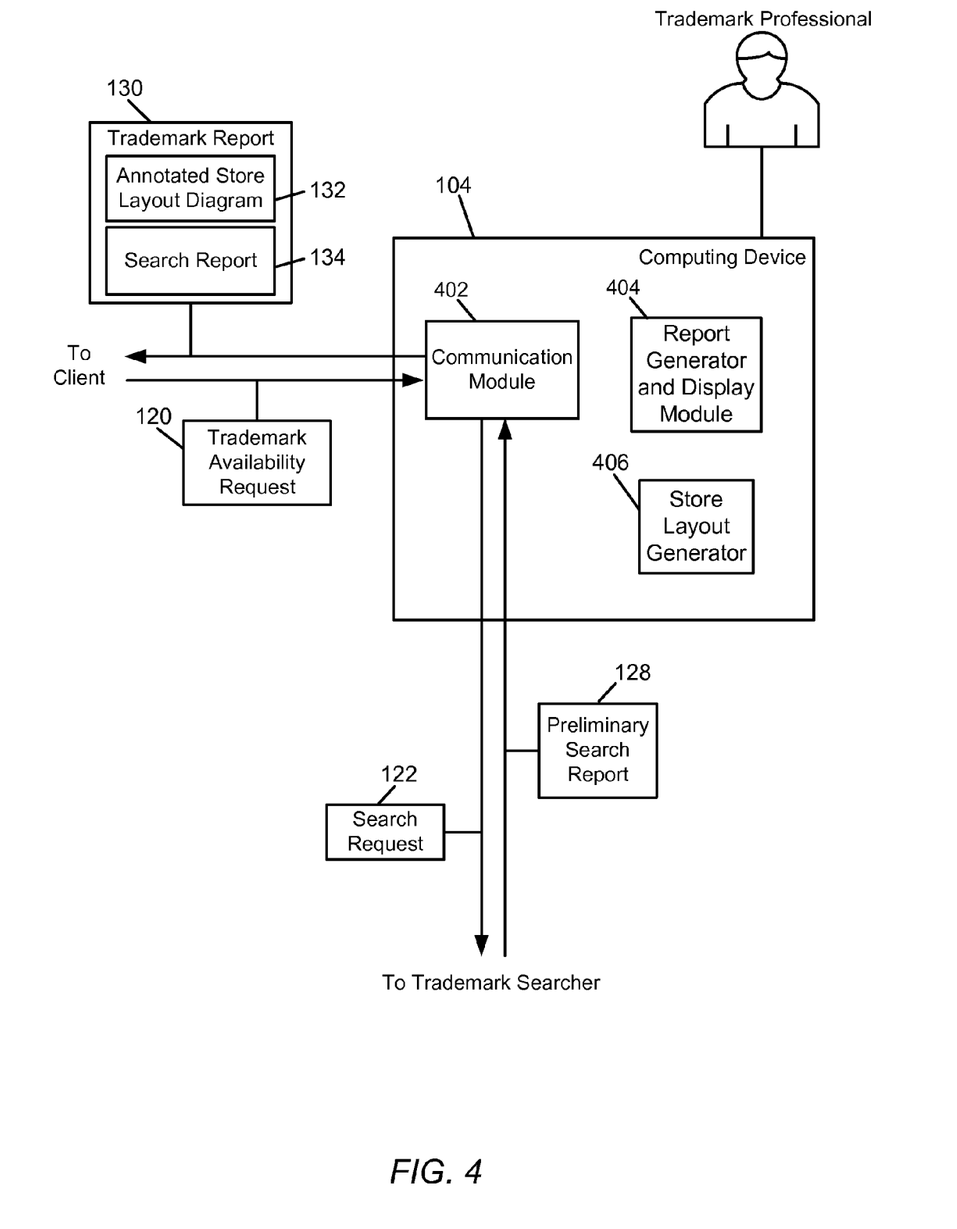
FIG. 4 illustrates a portion of system 100 including a trademark professional's computing device.

FIG. 4 illustrates a portion of system 100 including the trademark professional's computing device 104. In some embodiments, computing device 102 receives trademark availability request 120, generates search request 122, receives preliminary search report 128, and generates trademark report 130. In this example, computing device 104 includes communication module 402, report generator and display module 404, and store layout generator 406.

In some embodiments, trademark availability request 120 is received by computing device 104 through communication module 402. Examples of communication module 402 include an e-mail software application, a browser software application, a trademark interface application, other communication modules, and combinations of these. The browser software application can be used, for example, to interface with a remote server, such as operating a web-based e-mail system or the trademark interface application in some embodiments.

In one example, communication module 402 is an e-mail software application that receives trademark availability request 120 from the client in the form of an e-mail message. Communication module 402 displays the e-mail message to the trademark professional, who reviews the request.

Communication module 402 also operates, in some embodiments, to generate search request 122. As one example, the trademark professional interacts with computing device 104 to generate a search request 122, such as by sending an e-mail message to the trademark searcher. The search request 122 includes, for example, an identification of a trademark to be searched. Some embodiments further include an identification of the relevant goods and/or services to be searched. Some embodiments identify the search as being for a house mark or include a request for a brand expansion search. Some embodiments include an identification of a geographical scope for the search, such as to identify a country or set of countries where the mark is likely to be used.

Communication module 402 receives preliminary search report 128 from the trademark searcher and stores it in memory. In some embodiments the preliminary search report 128 is contained in an e-mail message, such as in an attachment to the e-mail message. The preliminary search report 128 is stored in memory at computing device 104. As one example, preliminary search report 128 is a PDF report. In other embodiments, other data formats are used, such as MICROSOFT OFFICE WORD software application document format. Typically the preliminary search report 128 includes a plurality of records, each record providing information about existing or planned trademark usage, such as by various third parties. The preliminary search report 128 may also include records relating to trademark usage by the client's company.

In some embodiments, report generator and display module 404 operates to open and display preliminary search report 128 to the trademark professional. If desired, the preliminary search report 128 can be printed onto paper for review by the trademark professional.

An example of report generator and display module 404 is the ADOBE ACROBAT software application. Other examples of report generator and display module 404 include the MICROSOFT OFFICE WORD software application, the ADOBE ACROBAT reader software application, a browser software application such as MICROSOFT INTERNET EXPLORER web browser, and combinations of these. Other graphic, text, or multimedia editors or reader software application are used in other embodiments, including a web-based application operating on a remote server. In some embodiments report generator and display module 404 is a custom software application.

Report generator and display module 404 displays preliminary search report 128, which is then reviewed by the trademark professional in some embodiments. The trademark professional reviews the records contained in the preliminary search report 128 and considers the relevance or importance of a given record to the client's trademark availability request 120 (shown in FIG. 1).

The trademark professional then interacts with computing device 104 to begin to generate trademark report 130. For example, in some embodiments the search report 134 of trademark report 130 is generated using data from preliminary search report 128. In some embodiments the trademark professional deletes records that have a low relevance or importance (such as using cut or delete operations of the report generator and display module 404), or adds additional records that were not in the preliminary search report 128 (such as by using cut and paste or import operations of the report generator and display module 404).

In another example embodiment, the trademark professional uses report generator and display module to print a copy of the preliminary search report 128 onto paper. The trademark professional then manually reviews the printed preliminary search report 128 and indicates which records within the report should be included in the search report 134. This can be done, for example, by placing an adhesive tab (such as POST-IT note sheet or POST-IT colored filing tab) on relevant records, or otherwise indicating the relevance of a record. Another option for indicating a relevance of a record is to dictate identifiers of the relevant records into a voice recorder. For example, if each record of the search report is identified by a record number, the trademark professional dictates a list of record numbers for each record to be included in search report 134. Page numbers can also be used in some embodiments to identify relevant records.

Once the relevant records are identified, the remaining records can be removed and any additional records, if any, can be added to generate search report 134. In some embodiments search report 134 is the same as preliminary search report 128. In another embodiment, search report 134 contains the same information as preliminary search report 128, but the data is formatted differently or stored in a different data format in search report 134. In some embodiments, search report 134 is generated on its own, separate from preliminary search report 128, such as by entering text and/or graphics into a document editing program, such as MICROSOFT OFFICE WORD.

Figure 5:
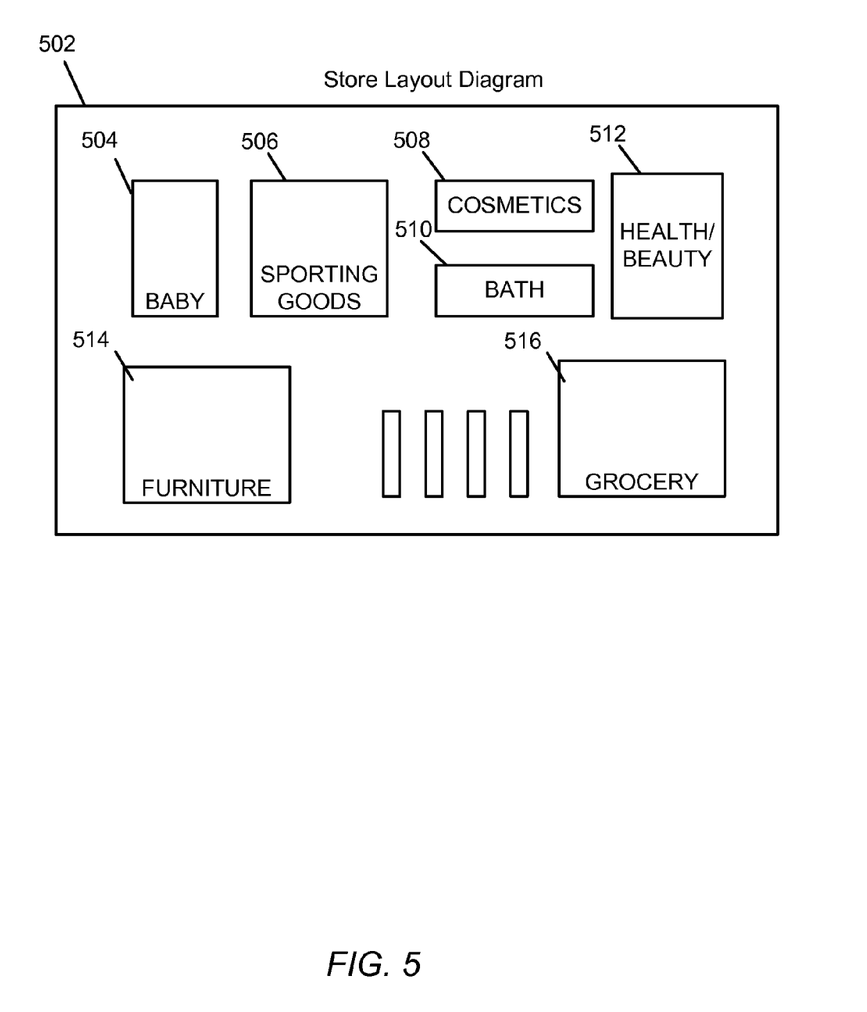
FIG. 5 illustrates an example store layout diagram used in the system shown in FIG. 1.
Figure 7:
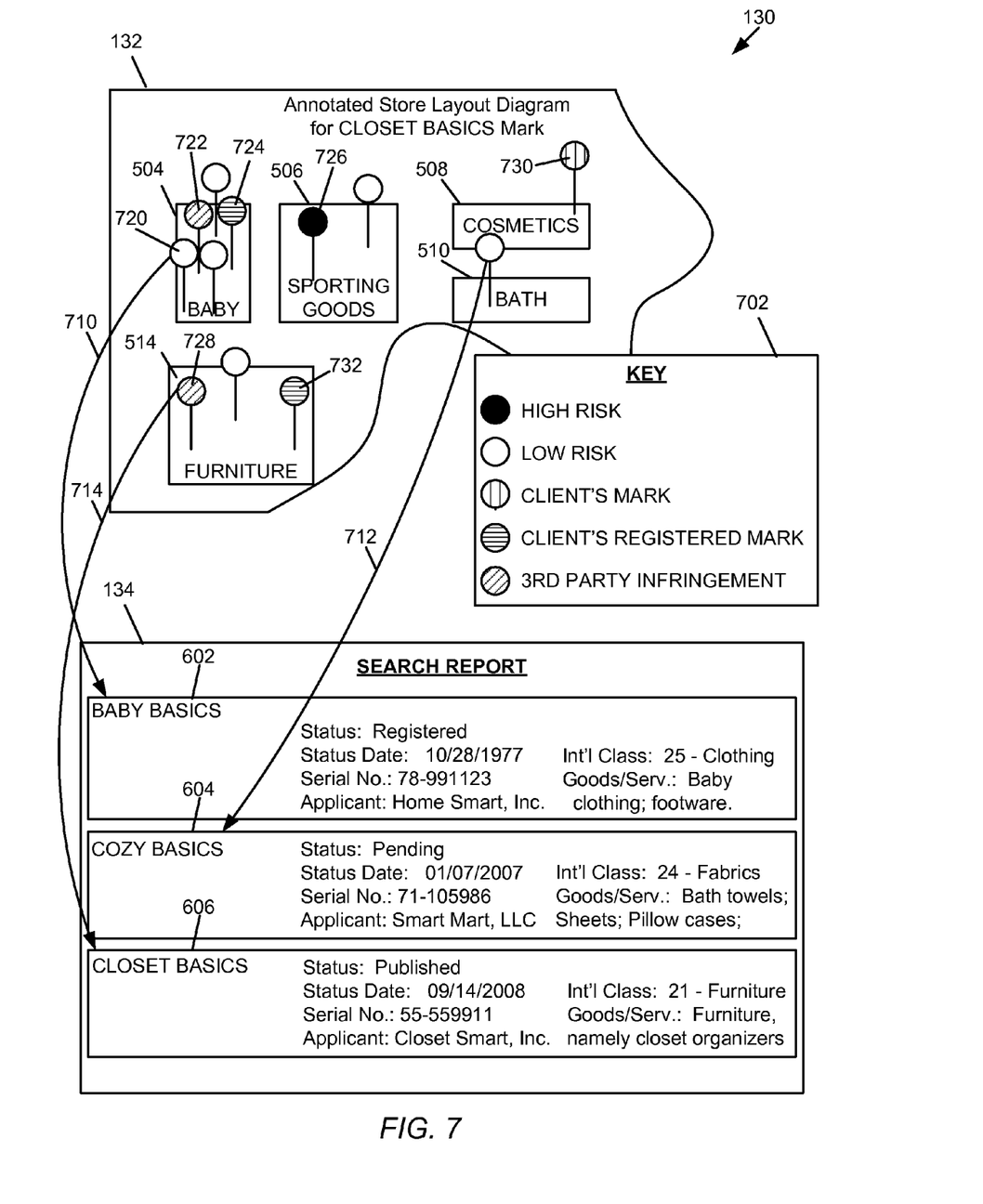
FIG. 7 illustrates portions of an example trademark report generated by the system shown in FIG. 1.

Store layout generator 406 is used in some embodiments to generate annotated store layout diagram 132 based on a store layout diagram 502. An example of a store layout diagram is shown in FIG. 5, and an example of an annotated store layout diagram 132 is shown in FIG. 7.

In some embodiments, store layout diagram 502 is provided by the client (or representative of the client), such as part of trademark availability request 120 or a separate communication. The store layout diagram 502 illustrates, for example, the arrangement of sections or departments of one of the client's stores. The store layout diagram 502 can be based on an actual store layout, based on a hypothetical store layout, or based on a combination of these. In another possible embodiment, store layout diagram 502 is generated by the trademark professional based on the trademark professional's knowledge of the products sold by the client, the services provided by the client, and the general layout of the client's store.

If the store layout diagram 502 is initially in a printed form (i.e., on paper), the store layout diagram 502 can be scanned into an electronic form. In some embodiments, the electronic form is an image file format or other document format. Examples of image file formats include joint photographic experts group (JPEG) format, exchangeable image file format (EXIF), tagged image file format (TIFF), raw image format (RAW), portable network graphics (PNG) format, graphics interchange format (GIF), bitmap file format (BMP), portable bitmap (PBM) format, Microsoft Visio (.vsd) vector graphics format, or other image file formats. Examples of document formats include the Microsoft Word (.doc) structural binary format, hypertext markup language (HTML), Office Open XML (.docx), PDF, Rich Text Format (RTF), and other document formats.

Once the store layout diagram 502 is obtained, the store layout generator 406 is used to generate annotated store layout diagram 132. As shown in FIG. 7, graphical elements that represent each of the (or a subset of the) trademarks identified in the search report 134 are arranged on the store layout diagram 502. The graphical elements are shown as being located on or within the section of the store where the goods or services associated with the particular trademark at issue are found within the store, or where the associated goods or services would be found within the store if they were distributed by the store.

As one possible example, a store layout diagram 502 is generated using the Microsoft® Visio® software application as the store layout generator 406. More specifically, shapes (such as boxes or lines) are arranged on the screen to generate an approximation of an actual or hypothetical store layout.

Next, the store layout generator 406 is used to annotate the store layout diagram 502 to begin to generate annotated store layout diagram 132. For example, the trademark professional (or his assistant or draftsman) uses the Microsoft® Visio® software application (or other graphics program) to add icons to the store layout diagram 502. An example of an icon is a graphical representation of a thumbtack or pin. Other icons or graphical elements are used in other embodiments, such as an arrow, a star, a rectangle, etc.

To determine the proper location of the icon for a given trademark, information about the trademark's usage is considered. For example, the record of the search report 134 associated with the given trademark is reviewed to identify the relevant goods and/or services, or the one or more relevant classifications. The store layout diagram 502 is then reviewed. The trademark professional then determines where the goods or services associated with the given trademark are (or would most likely be) located within the store. More specifically, a section of the store layout diagram is identified. Once identified, the icon is then placed on or within the graphical element that represents that section of the store using the store layout generator 406. Alternatively, the trademark is otherwise associated with that section of the store, such as being included in a list of trademarks for a given section of the store. The process continues until icons have been arranged on the store layout diagram 502 for all or a subset of the trademarks identified in the search report 134. In some embodiments, color coding is used to provide further information about the trademark in the annotated store layout diagram 132, as discussed below.

After annotated store layout diagram 132 has been generated, it is input into report generator and display module for inclusion in trademark report 130. As one example, the annotated store layout diagram 132 is printed to a PDF document or scanned and saved as a PDF document. Other formats are used in other embodiments, as discussed herein.

In some embodiments, report generator and display module 404 operates to combine annotated store layout diagram 132 and search report 134 into a single trademark report 130. As one example the annotated store layout diagram 132 is provided at or near the beginning of trademark report 130, and search report 134 is provided after annotated store layout diagram 132. Additional information can also be included in trademark report 130, if desired. For example, the trademark professional can include a letter or written trademark availability opinion as a part of trademark report 130. The letter can, for example, provide a brief summary of the search and results. A written trademark availability opinion can, for example, provide a more detailed analysis of the results and advice to the client, such as to help the client evaluate the risk in adopting the trademark and determine whether or not to proceed with the chosen trademark. A letter or written opinion can alternatively be provided separate from trademark report 130 if desired, such as within an e-mail message or as a separate document.

In some embodiments report generator and display module 404 operates to link icons of annotated store layout diagram 132 with the associated records of search report 134. For example, the report generator and display module 404 generates a link for a given icon in the annotated store layout diagram 132. For example, when report generator and display module 404 is the ADOBE ACROBAT software application, the link tool is selected by the trademark professional. Next, the trademark professional selects a region where the icon is located within the annotated store layout diagram 132. The desired settings for the link are then selected from the Create Link dialog box (such as "invisible rectangle" as the link type, "none" as the highlight style, and "Go to a page view" as the link action). The record to be associated with the link is then identified, such as by scrolling to the page in the trademark report 130 and selecting the "set link" option. The process continues until all links have been created.

Once the links have been created, the icons can be selected by a user (such as the trademark professional or the client) when the trademark report 130 is displayed by report generator and display module 404 or report display module 304. Once an icon has been selected, the respective report display module updates the display of the trademark report 130 to display the record of the search report 134 associated with that icon, which allows the user to view additional information about the selected trademark.

In another possible embodiment, report generator and display module 404 and store layout generator 406 are custom software applications that automatically perform some or all of the respective operations. For example, the store layout generator 406 automatically identifies locations or proposed locations for each trademark icon by comparing a description of goods and services (and/or associated classification code) with descriptions of products or lists of goods and services that are provided at the various sections of the store, and determines the section which most closely matches the goods and services associated with the trademark. The icon is then associated with that section of the store in the annotated store layout diagram 132.

In some embodiments, selection of an icon in the annotated store layout diagram 132 causes the report display module 404 or 304 to display additional information about the trademark associated with that icon. For example, a pop-up window is displayed that contains information about the trademark, such as some or all of the following: the text of the trademark, status, owner, first date of use, description of goods and services, international classification, etc. In other embodiments the information is shown in another window or portion of the display. The information can include, in some embodiments, a selectable control. When the selectable control is selected by a user, the report display module (404 or 304) displays the relevant record of the search report 134.

Communication module 402 is used, in some embodiments, to communicate the completed trademark report 130 to the client. Alternatively, trademark report 130 is printed onto paper and mailed to the client, such as via a mail delivery system.

FIG. 5 illustrates an example store layout diagram 502. In this example, store layout diagram 502 is a graphical representation of an actual or hypothetical store layout, including a plurality of store sections. In this example, store layout diagram 502 includes baby section 504, sporting goods section 506, cosmetics section 508, bath section 510, health and beauty section 512, furniture section 514, and grocery section 516.

Each section of the store layout diagram is represented by a graphical element. In this example, the graphical elements are rectangles that approximate the size and location of the respective section in the store. A label is also provided in each section, in some embodiments, to identify that section of the store. For example, the baby section 504 includes a label "BABY." Other graphical elements are used in other embodiments.

In some embodiments, each section of the store includes a set of products or services that are related to each other. For example, the baby section 504 represents a section of the store in which baby products are sold. The sporting goods section 506 represents a section of the store in which sporting goods are sold.

Figure 6:
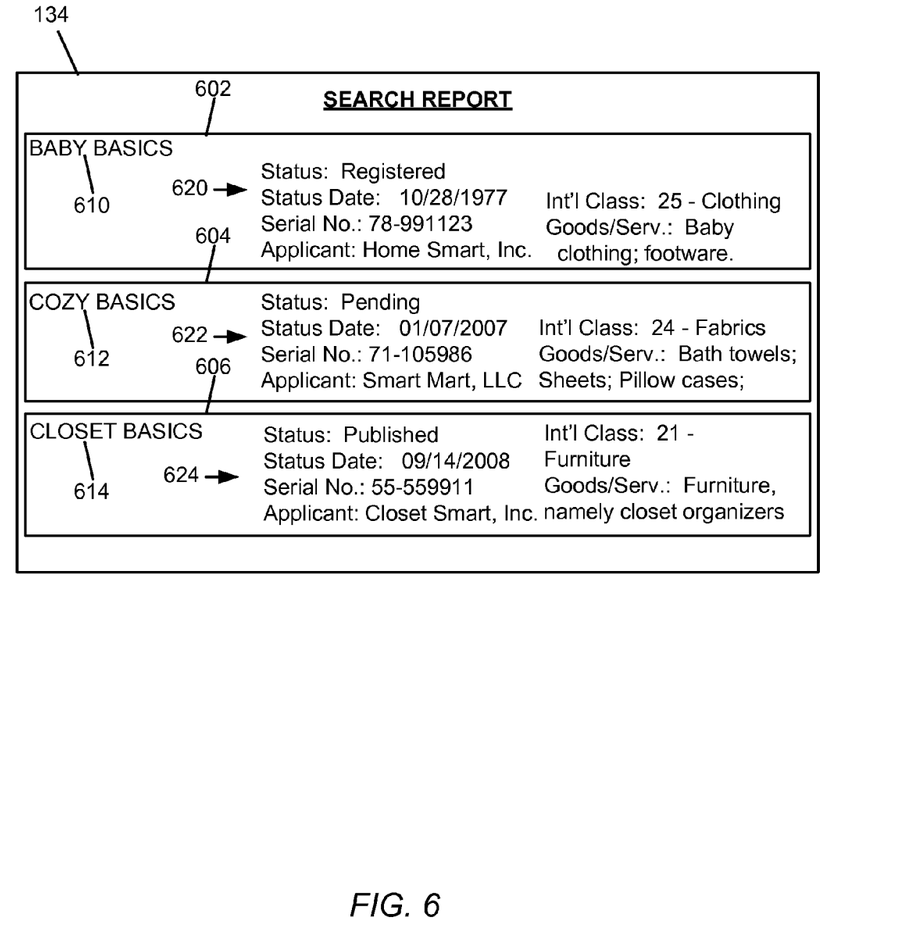
FIG. 6 illustrates an example search report generated by the system shown in FIG. 1.

FIG. 6 illustrates an example search report 134 including a plurality of records 602, 604, and 606.

In this example, each record includes an identification of the trademark 610, 612, and 614 from the trademark records 602, 604, and 606. For example, record 602 includes trademark 610 for "BABY BASICS." Record 604 includes trademark 612 for "COZY BASICS." Record 606 includes trademark 614 for "CLOSET BASICS." Records 602, 604, 606 can also include additional trademark information 620, 622, and 624 in some embodiments. Examples of other trademark information include status, status date, serial number, applicant, international classification, description of goods/services, and other information. If a trademark is a stylized mark, the styled mark is shown in some embodiments. In some embodiments each record is displayed on a separate page or is displayed in a separate window, while in other embodiments the records continue one after another.

FIG. 7 illustrates portions of an example trademark report 130. In this example, trademark report 130 includes annotated store layout diagram 132 and search report 134 that were generated as a hypothetical example for the trademark CLOSET BASICS. Annotated store layout diagram 132 includes a representation of a store layout, including a plurality of sections 504, 506, 508, 510, and 514, and also includes a plurality of icons 720, 722, 724, 726, 728, 730, and 732. A key 702 is provided in some embodiments to show the meaning of icon color codes. Search report 134 includes records 602, 604, and 606. Only a portion of search report 134 is shown. Icons are associated with the respective records by links 710, 712, and 714.

In some embodiments, a store layout diagram 502 (shown in FIG. 5) is annotated to include a plurality of icons 720, 722, 724, 726, 728, 730, and 732. In this example, each icon represents a trademark that was identified through a trademark search. The icons are arranged on the store layout diagram such that each icon is associated with a section 504, 506, 508, 510, and 514 of the store where the product or service associated with the trademark is, or would most likely be, found in the store. For example, icon 720 represents the trademark "BABY BASICS," which is used on baby clothing and footware, as indicated in record 602 of search report 134. Accordingly, icon 720 is located on the baby section 504.

The annotated store layout diagram 132 allows a viewer to quickly see the relative density of marks for a given section of the store. For example, the annotated store layout diagram 132 illustrates that there are five existing trademarks in baby section 504, as shown by the five icons shown in that section. Similarly, the annotated store layout diagram 132 illustrates that there is only one existing trademark in cosmetics section 508, because there is only one icon shown in this section. Further, the color coding shows that this icon represents one of the client's own marks. Therefore, the client or trademark professional may determine that there is low risk for expansion of the trademark in cosmetics products.

Color coding of icons is used in some embodiments to provide additional information to the viewer of the annotated store layout diagram 132. An example color coding scheme is illustrated in key 702, which is only one example of the many possible color coding schemes. In this example, a red icon (represented by solid black) is used to represent a third-party trademark that poses a high risk to the client. An example of a high risk mark is represented by icon 726 in the sporting goods section 506. A high risk mark is one that has a high likelihood of causing confusion in the consumer. As a result, if the client were to proceed with the mark in connection with those goods and services (i.e., sporting goods), the client would have a high risk that the prior user would attempt to stop the use or that the prior user's registration would be cited against an application for the client's proposed mark. An example of a high risk mark is one in which the mark and the associated goods/services are identical to the proposed mark and goods/services.

A yellow icon (represented by a solid white icon) is used to indicate a third-party trademark that poses a low risk to the client, should the client decide to pursue use of the trademark in connection with the associated goods or services. An example of a yellow icon is icon 720, which is associated with record 602 for the BABY BASICS mark, as indicated by link 710. In this example, the trademark professional has determined that there is a low risk to the client for use of the mark CLOSET BASICS, despite the existence of the BABY BASICS mark. For example, the trademark professional may have considered the words "closet" and "baby" to be the dominant portions of the mark, which are very different words. Accordingly, the trademark professional determined that there is a low risk in proceeding with use of the mark and represented icon 720 with a yellow color.

A light green icon (represented by vertical cross hatching) is used to indicate a trademark owned by the client that has not been officially registered. The mark may be in use in commerce, or may be an intent-to-use trademark application, for example. In any event, the light green icon indicates that this trademark is not likely to pose a problem for the client, and may actually help the client's ability to expand into this section. An example of a light green icon is icon 730, shown in the cosmetics section 508.

A solid green icon (represented by horizontal cross hatching) is used to indicate a registered trademark that is owned by the client. This indicates that the trademark is not likely to pose a problem for the client. An example of a solid green icon is icon 724 that is located in the baby section 504.

A blue icon (represented by diagonal cross hatching) is used to indicate a trademark that is being used by a third party that may be an infringement on the client's trademark rights. An example is icon 728 for the mark CLOSET BASICS is located in the furniture section 514, which is associated with record 606, as shown by link 714. In this example, as shown by icon 732, the client already owns a trademark in furniture section 514. The blue color of icon 728 indicates that the trademark professional believes that the third party trademark is likely to cause confusion (such as due to very similar marks used on very similar goods) in the marketplace (such as due to very similar marks used on very similar goods) and that the client may want to consider taking action against this potential infringement.

Other embodiments include other visual status indicators, other than or in addition to color coding. Examples include using different shapes, sizes, shading, display types (e.g., flashing or constant), etc. Pop-up dialog windows are used to provide additional status information in some embodiments, which can be displayed upon click or mouse-over, for example. Some embodiments include more or fewer status indicators than the five color codes shown in this example.

In some embodiments, icons 720, 722, 724, 726, 728, 730, and 732 are linked to the associated records of the search report, as illustrated by links 710, 712, and 714. When a user selects a link, such as by clicking on an icon, the display is updated to cause the associated record to be displayed to provide more information about the trademark. For example, when icon 720 is selected, the link 710 is activated and record 602 is displayed. This can include, for example, scrolling to a page where record 602 is found in the trademark report 130, or displaying another window or pop-up dialog box containing additional information. A back button is provided in some embodiments to return to the annotated store layout diagram 132 display.

Figure 8:
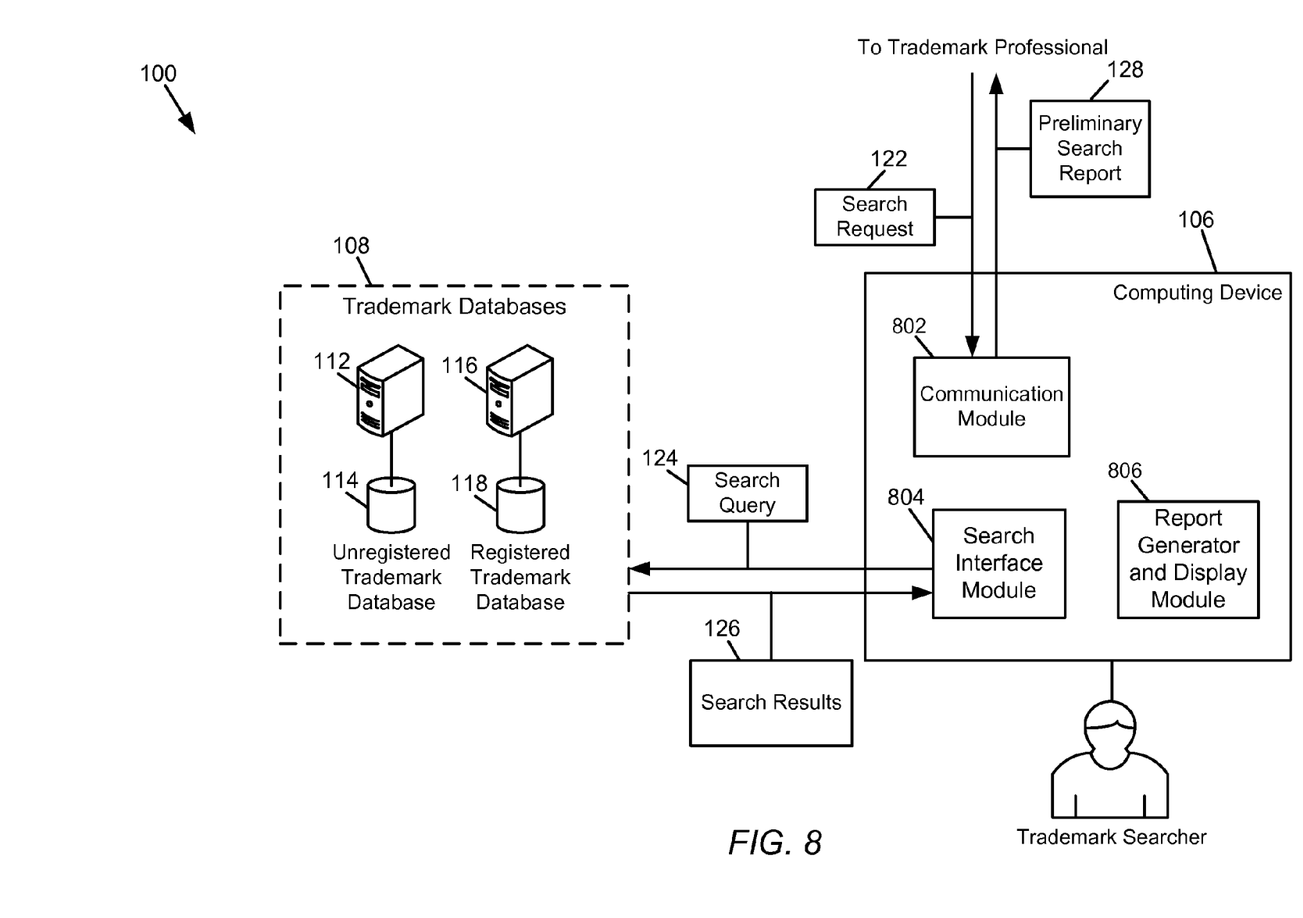
FIG. 8 illustrates a portion of system 100 including a trademark searcher's computing device.

FIG. 8 illustrates a portion of system 100, including the trademark searcher's computing device 106. In this example, computing device 106 includes communication module 802, search interface module 804, and report generator and display module 806. In some embodiments, computing device 106 receives search request 122, generates search query 124, receives search results 126, and generates preliminary search report 128.

In some embodiments, communication module 802 receives search request 122 through communication module 802. Examples of communication modules are described herein, such as an e-mail software application. The communication module displays the search request 122 to the trademark searcher, who determines that a trademark search has been requested for a given trademark.

In some embodiments, computing device 106 includes search interface module 804, which the trademark searcher interacts with to perform searches on trademark databases 108. An example of a search interface module 804 is a browser software application. Other embodiments include other search interface modules, such as a database searching software application, or a custom software application. The trademark searcher interacts with search interface module 804 to generate search query 124, which is sent to one or more of trademark databases 108. Other examples of search interface modules include a communication module, such as those described herein, that allows the trademark searcher to communicate with trademark databases 108.

In this example, trademark databases 108 includes server 112 that performs searching of unregistered trademark database 114, and server 116 that performs searching of registered trademark database 118. An example of servers 112 and 116 is the computing device shown in FIG. 2.

A more specific example of server 112 is a web server operated by an internet search engine, such as the Google® GOOGLE search engine, the BING search engine, or the YAHOO! search engine. In some embodiments server 112 is more than one server that operate together to perform searching of unregistered trademark database 114. The server 112 receives the search request 122 and executes a search query across unregistered trademark database 114 (or an index of the database, such as across a content index). In some embodiments the search query 124 includes keywords, which are compared to the content of documents in the unregistered trademark database 114. Further, some embodiments include scope limitations in search query 124 to restrict searching to documents that are within the given scope.

A more specific example of server 116 is a server operating the Trademark Electronic Search System (TESS) provided by the United States Patent and Trademark Office for searching registered trademark database 118. Other embodiments include the searching systems provided by other governmental agencies. Another example of server 116 is a server operated by a commercial trademark searching vendor, who maintains records of registered trademarks, such as obtained from the United States Patent and Trademark Office or from other governmental agencies.

Servers 112 and/or 116 execute the search query and provide search results 126 back to search interface module 804. In some embodiments the search interface module 804 is used to collect records of relevant trademarks and to store the records on computing device 106.

Report generator and display module 806 is then used to display records obtained through search interface module 804 to the trademark searcher. Examples of report generator and display modules are described herein. In some embodiments the trademark searcher performs an initial review of the records to determine whether the trademark record is relevant to the search request 122. Relevant records are then compiled using report generator and display module 806 into preliminary search report 128.

The preliminary search report 128 is then communicated to the trademark professional using communication module 802. Alternatively, or in addition, the preliminary search report 128 is printed onto paper and mailed to the trademark professional via a mail delivery system.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of graphically depicting trademark information, the method comprising:
    obtaining a trademark search report including a plurality of trademark records, the trademark records identifying trademarks found in a trademark search and descriptions of goods or services associated with the trademarks;
    associating the trademarks from the trademark search report with sections of a store by:
        identifying types of goods or services located within the sections of the store;
        comparing the descriptions of goods or services associated with one of the trademarks with the types of goods or services located within the sections of the store; and
        determining one or more matching sections of the store in which the type of goods or services match the descriptions of goods or services associated with the one of the trademarks; and
    annotating a store layout diagram with icons by a computing device, including:
        displaying the store layout diagram including graphical elements representing the sections of the store, and
        displaying icons on the store layout diagram representing at least some of the trademarks of the trademark search report, wherein the icons are positioned on the annotated store layout diagram to visually associate the icon with the one or more matching sections of the store, and wherein the icons at least convey information about a risk level of the trademark represented by the icon.

2. The method of claim 1, wherein each icon is positioned to at least partially overlap the at least one section of the store to which it is associated.

3. The method of claim 1, wherein icons are color coded, and wherein at least one color code conveys information about the risk level of the trademark represented by the icon.

4. The method of claim 1, wherein the icons are linked to the trademark records of the trademark search report, wherein upon selection of one of the icons, a corresponding record of the trademark search report is displayed by the computing device, the record including information about the trademark represented by the icon.

5. The method of claim 1, wherein the store layout diagram graphically depicts a physical layout of a store.

6. The method of claim 1, further comprising:
    submitting a trademark search request to a trademark searcher, the trademark search request including an identification of a proposed trademark, a request to perform a trademark search, an identification of a scope of goods and services to be searched, and an identification of a geographical scope for the search;
    receiving a preliminary search report from the trademark searcher, the preliminary search report including records, each record being associated identified trademarks;
    generating the trademark search report including at least some of the records from the preliminary search report; and
    receiving the store layout diagram.

7. The method of claim 6, further comprising:
    generating a trademark report, the trademark report including the annotated store layout diagram and the trademark search report; and
    communicating the trademark report to a client.

8. A non-transitory computer readable medium containing computer readable instructions that when executed by a processing device cause the processing device to:
    obtain a trademark search report including a plurality of trademark records, the trademark records identifying trademarks found in a trademark search and descriptions of goods or services associated with the trademarks;
    associate the trademarks from the trademark search report with sections of a store, including:
        identify types of goods or services located within the sections of the store;
        compare the descriptions of goods or services associated with one of the trademarks with the types of goods or services located within the sections of the store; and
        determine one or more matching sections of the store in which the type of goods or services match the descriptions of goods or services associated with the one of the trademarks; and
    annotate a store layout diagram with icons by a computing device, including:
        display the store layout diagram including graphical elements representing the sections of the store, and
        display icons on the store layout diagram representing at least some of the trademarks of the trademark search report, wherein the icons are positioned on the annotated store layout diagram to visually associate the icon with the one or more matching sections of the store, and wherein the icons at least convey information about a risk level of the trademark represented by the icon.

9. The computer readable medium of claim 8, wherein the instructions further cause the processing device to:
generate a trademark report including the store layout diagram and a search report, wherein the search report includes records for each of the trademarks in the set of trademarks.

10. The computer readable medium of claim 9, wherein the instructions further cause the processing device to:
generate a link between each icon and associated records of the search report, wherein the link is selectable, and wherein upon selection of the link, one of the records of the search report is displayed.

11. The computer readable medium of claim 8, wherein at least some of the icons are color coded.

12. The computer readable medium of claim 11, wherein the color coding further conveys one or more of: a low risk, a high risk, ownership, registration, lack of registration, and possible trademark infringement by a third party.

13. The computer readable medium of claim 8, wherein the store layout diagram further includes labels on each of the sections of the store to identify the sections of the store.

14. A system for generating a trademark report, the system comprising:
a display device;
a processing device; and
a memory, the memory storing instructions which, when executed by the processing device, cause the processing device to:
obtain a trademark search report including a plurality of trademark records, the trademark records identifying trademarks found in a trademark search and descriptions of goods or services associated with the trademarks;
associate the trademarks from the trademark search report with sections of a store, including:
identify types of goods or services located within the sections of the store;
compare the descriptions of goods or services associated with one of the trademarks with the types of goods or services located within the sections of the store; and
determine one or more matching sections of the store in which the type of goods or services match the descriptions of goods or services associated with the one of the trademarks; and
annotate a store layout diagram with icons by a computing device, including:
display the store layout diagram including graphical elements representing the sections of the store, and
display icons on the store layout diagram representing at least some of the trademarks of the trademark search report, wherein the icons are positioned on the annotated store layout diagram to visually associate the icon with the one or more matching sections of the store, and wherein the icons at least convey information about a risk level of the trademark represented by the icon.

15. The system of claim 14, wherein the icon is linked to a record of the trademark search report, wherein upon selection of the icon, the record is displayed on the display device, the record including additional information about the associated trademark.

16. The system of claim 15, further comprising:
a report generator and display module executed by the processing device to receive inputs from a user to define the links between icons graphical elements and records of the search report.

17. The system of claim 14, further comprising:
a store layout generator executed by the processing device to receive inputs from a user identifying a position on the store layout diagram, wherein the graphical element is subsequently arranged at the position to annotate the store layout diagram.

18. The system of claim 14, wherein the processing device is part of a Web server and the display device is part of a remote computing device.

* * * * *